No. 616,978. Patented Jan. 3, 1899.
F. W. SCHNEIDER.
STORAGE BATTERY.
(Application filed Dec. 3, 1896.)

(No Model.) 2 Sheets—Sheet 1.

WITNESSES
INVENTOR
Friedrich Wilhelm Schneider
BY Richardson
ATTORNEYS

No. 616,978. Patented Jan. 3, 1899.
F. W. SCHNEIDER.
STORAGE BATTERY.
(Application filed Dec. 3, 1896.)

(No Model.) 2 Sheets—Sheet 2.

WITNESSES

INVENTOR
Friedrick Wilhelm Schneider
BY
ATTORNEYS

UNITED STATES PATENT OFFICE.

FRIEDRICH WILHELM SCHNEIDER, OF TRIBERG, GERMANY, ASSIGNOR TO THE ELECTRICITÄTS-GESELLSCHAFT TRIBERG, GESELLSCHAFT MIT BESCHRÄNKTER HAFTUNG, OF SAME PLACE.

STORAGE BATTERY.

SPECIFICATION forming part of Letters Patent No. 616,978, dated January 3, 1899.

Application filed December 3, 1896. Serial No. 614,356. (No model.)

*To all whom it may concern:*

Be it known that I, FRIEDRICH WILHELM SCHNEIDER, a subject of the Grand Duke of Baden, residing at Triberg, in the Grand Duchy of Baden, German Empire, have invented certain new and useful Improvements in Storage Batteries, of which the following is a full and clear description.

My invention is an electrode for storage batteries; and it consists in the special combination of elements hereinafter fully described and claimed.

Figure 1:
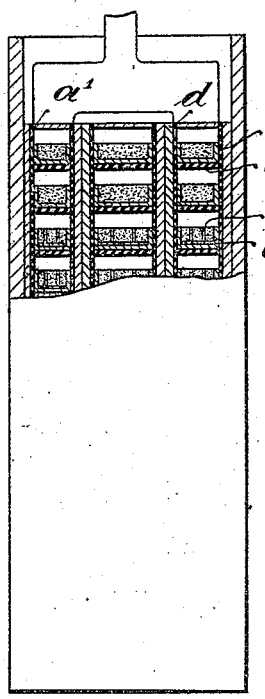
Figure 2:
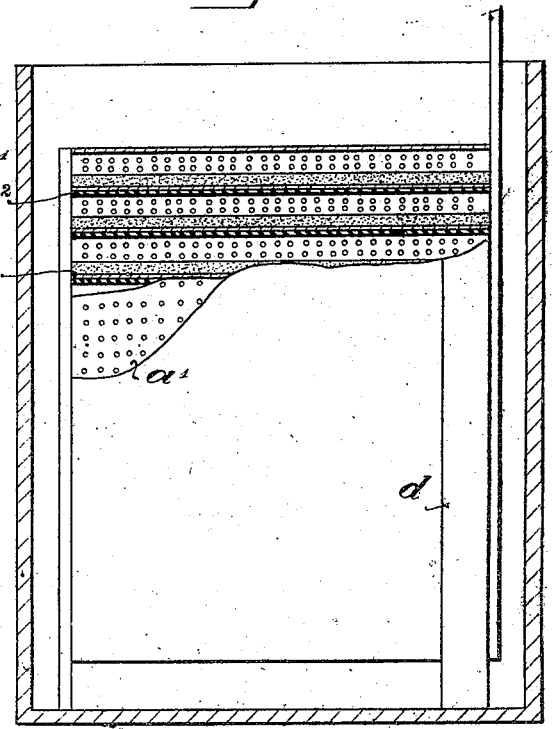
Figure 3:
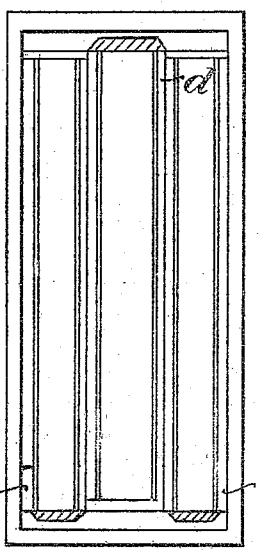

In the drawings, Figure 1 is a view of a battery-cell partly broken away. Fig. 2 is a side view of the same. Fig. 3 is a plan view, and Fig. 4 is a sectional view, of a modification.

The electrode comprises two outer perforated plates $a'$, having cross-stays $a^2$ extending between, upon which the troughs $b$ rest, the latter carrying the active material, with current-conductors $c\ c$ embedded therein. The plates $a'$ and the stays $a^2$ are formed of non-conducting material, as celluloid. The troughs $b$ may be of conducting material. The electrolyte enters through the perforations in the plates $a'$ to the space above the troughs and upon the active material.

Plates or strips $d$ may be inserted between the plates $a'$ of adjacent electrode members to provide space between them for the circulation of the electrolyte.

Figure 4:
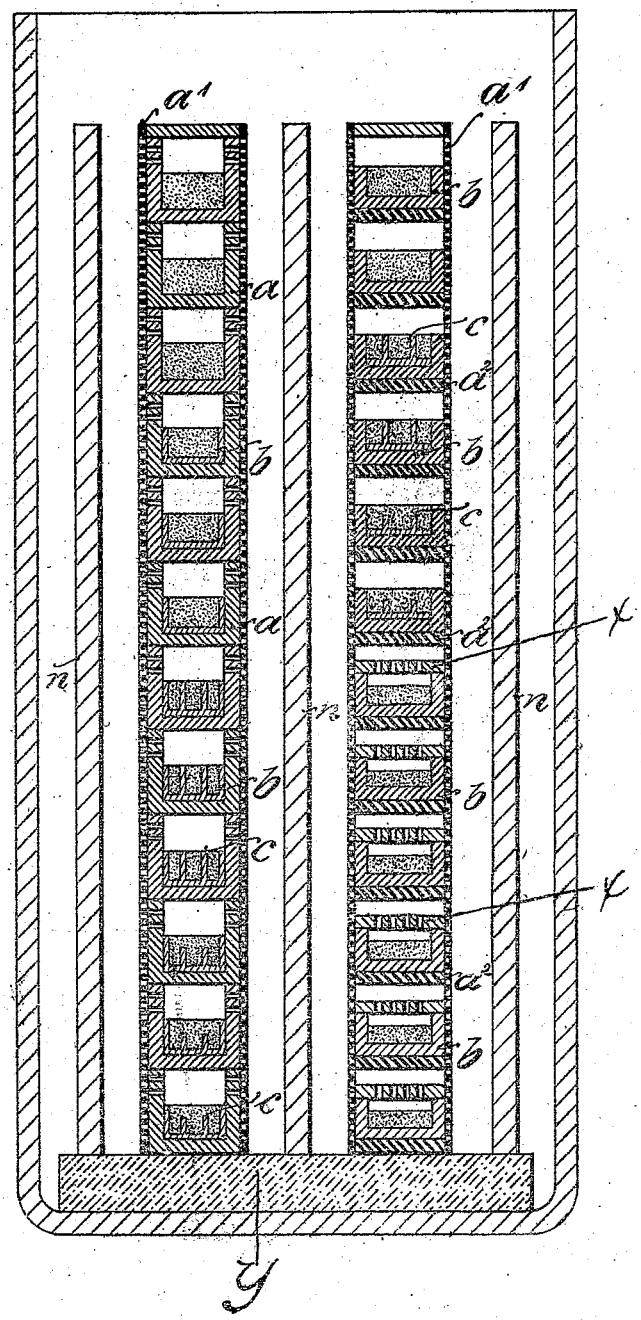

Fig. 4 shows a modification in which a series of troughs $b$ with active material are carried by outer troughs $a$, having perforated upper edges, the latter troughs being held between the plates. This figure shows the negative electrodes $n$, while the electrodes described above form the positive elements in the battery.

The block Y at the bottom of Fig. 4 is of india-rubber or other suitable insulating material. Said block has for its purpose to provide a soft bearing to the electrodes. The current-conductors $c\ c$ are usually of lead or lead composition.

The troughs may be covered with perforated covers X, Fig. 4, which will permit the access of liquid to the troughs and to the active material.

I claim—

In a secondary battery, the combination with a supporting-frame consisting of a series of insulating-troughs arranged one above the other and having perforated side walls, of trough-shaped current-conductors inserted in said trough and having projections on their inner surface, and of active material filled in said current-conductors, substantially as described.

In testimony whereof I have signed this specification in the presence of two subscribing witnesses.

FRIEDRICH WILHELM SCHNEIDER.

Witnesses:
ALBERT T. PORZINGER,
FRANZ CONRAD.